United States Patent [19]

Smith

[11] 4,313,786
[45] Feb. 2, 1982

[54] MAGNETRON SOLVENT RECOVERY SYSTEM

[76] Inventor: Jerold B. Smith, P.O. Box 4234, Wilmington, Del. 19807

[21] Appl. No.: 195,427

[22] Filed: Oct. 9, 1980

Related U.S. Application Data

[63] Continuation of Ser. No. 59,599, Jul. 23, 1979, abandoned.

[51] Int. Cl.$^3$ .............................................. B01D 1/00
[52] U.S. Cl. ............................ 159/22; 159/DIG. 26; 159/DIG. 10; 219/10.55 M; 528/502
[58] Field of Search ................................ 219/10.55 M; 159/DIG. 26, DIG. 10, 22; 528/500–502; 260/2.5

[56] References Cited

U.S. PATENT DOCUMENTS

| | | | |
|---|---|---|---|
| 3,294,879 | 12/1966 | Jacobs | 219/10.55 M |
| 3,311,676 | 3/1967 | Toekes | 528/501 |
| 3,432,636 | 3/1969 | Sargeant | 159/DIG. 26 |
| 3,495,648 | 2/1970 | Amadon | 159/DIG. 26 |
| 4,026,931 | 5/1977 | Wiesel et al. | 260/2.5 |

OTHER PUBLICATIONS

Handbook of Foamed Plastice, Rene J. Bender, 1965, pp. 126, 127, Lake Publishing Co.
Polyurethanes Chemistry and Technology, Saunders and Frisch, 1962, p. 237, Interscience Publishers.

*Primary Examiner*—Norman Yudkoff
*Attorney, Agent, or Firm*—Eugene M. Bond

[57] ABSTRACT

Patent discloses a method and an apparatus for the recovery of organic solvents from mixtures of organic solvents and polymers soluble or dispersible in the organic solvents. The method comprises the heating, by microwave radiation utilizing a magnetron type radiation source, of the mixture causing said mixture to reach the heat of flashing and/or evaporation of the solvent, collecting the solvent as it so vaporizes and recovering fresh solvent. The dry cake can be discarded or reused depending upon the extent of polymerization.

2 Claims, 1 Drawing Figure

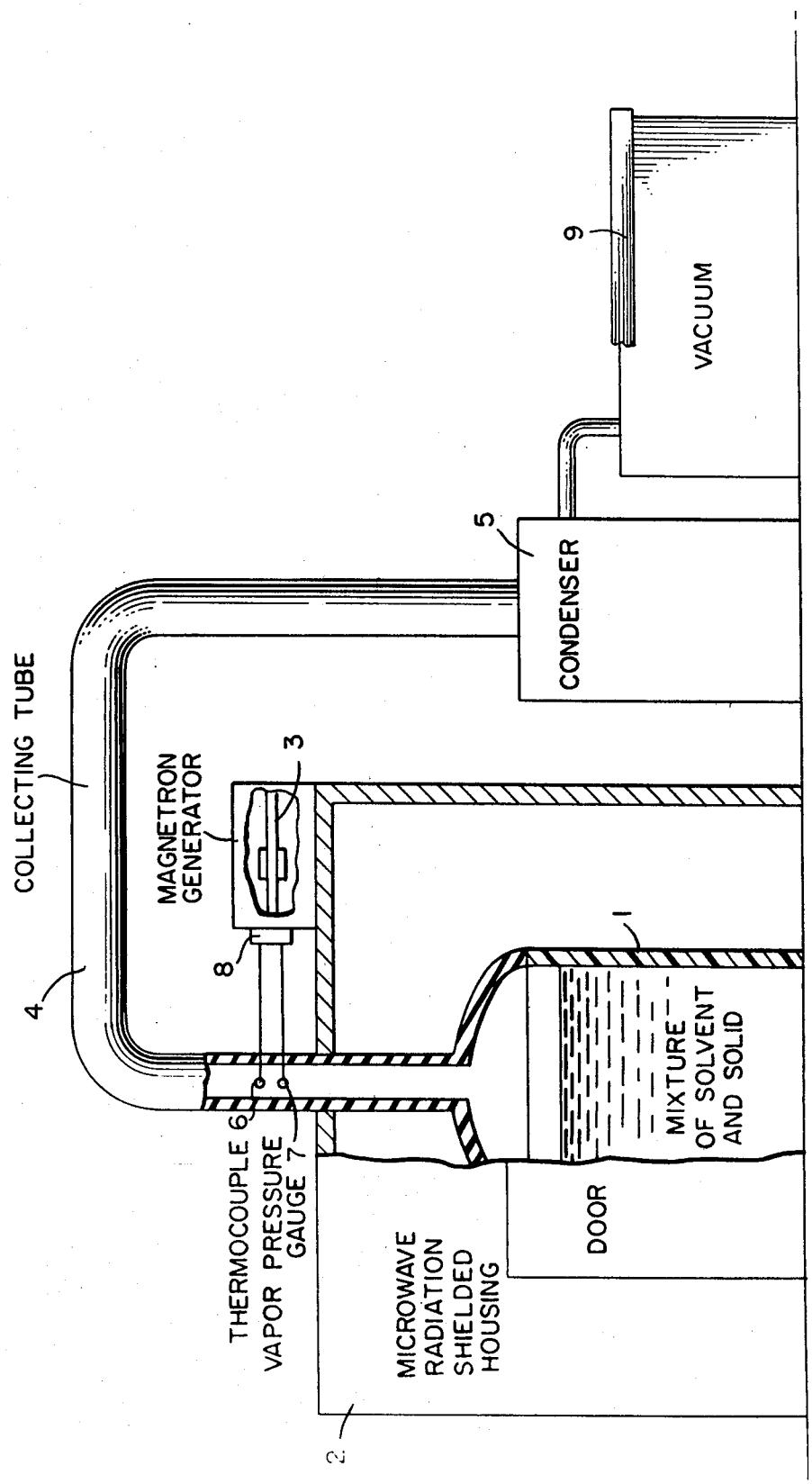

MAGNETRON SOLVENT RECOVERY SYSTEM

A method of recovery of organic solvents from solvent polymer mixtures is disclosed which is also contained in parent application Ser. No. 059,599 filed July 23, 1979, now abandoned of which the instant application is a continuation. An apparatus for effecting the method of this invention is also disclosed.

To those skilled in the art, a consistent problem polymer users and polymer manufacturers encounter is the handling of organic solvent mixed with large portions of polymer. These solvent mixtures may be saturated and thus cannot absorb any more polymer or may be dispersions, etc. of high concentration. It is not atypical for this mixture to be discarded rather than face the difficult separation of the solvent from the polymer. However, with the spiraling cost of solvent, this is less and less desirable. In addition, the strict enforcement of air and water pollution has placed the expense of discarding the mixtures into a prohibitively high expense range.

The most usual cause of the large volume of such polymer-organic solvent mixtures is the use of the organic solvent as a wash media in a plant. That is, in order to keep the molds which are turning out the thread, or plastic articles manufactured by the polymer users clean and free of polymer after each use, the equipment is cleaned with organic solvent which dissolves the adhering polymer. This solvent is then collected and stored and reused until it becomes saturated with polymer or may be used in other parts of the manufacturing plant where solvent is required.

It is the object of this invention to provide an apparatus utilizing microwave radiation for the separation of the organic solvent and polymer mixtures.

It is another objective of this invention to provide a method which can easily and safely be used by large and small manufacturers of polymer artifacts alike with easy recovery of the solvent and the polymer residue.

Still further objects of this application become evident to those skilled in the arts by the following spcifications:

Organic solvents such as acetone, methyl alcohol, ethyl alcohol, butynol, butylacetate, butylketone carbonyl, ethers, acetone, ketones or alcohols with a carbon chain length of from about C-1 to about C-10 and other organic solvents are utilized in the polymer industry as washing solvents to keep equipment such as molds, threading machines, thread making machines, cleaning machines, dying machines, paint pigment mixing apparatus, tanks, and other types of apparatus utilizing polymers free of adhering polymer and pigments. Naturally, where water is a solvent this system may be used to evaporate it providing an easily disposable cake.

It has been found that these solvents soon become saturated with polymer or pigment and can no longer be effectively used to clean the apparatus. This may be at concentrations from a few weight percent solids to about 95 weight percent solids depending upon the mixture or the solution formed. In any case, the mixture or the solution are liquid even if a 95 weight percent solid content is present. At that point the mixtures and solutions of the solids in solvent are discarded. Attempts to distill the solution by conventional systems fail due to the solid residue. Thus, in immersion heat, the coils and other immersion devices become coated with polymer and cannot be reutilized. When external heating is utilized, it is found that the containers become caked with the polymer and are difficult to clean. Also, the polymer vessels contemplated for ease of solid removal will not stand up to the high temperatures of an external heat source. Because of all these equipment problems and waste disposal problems, a method of economical recovery of the solvent is necessary.

The method of this invention utilizes non-metallic containers. For example, containers made from high temperature plastics such as Teflon ® and high density polyethylene and polypropylene or glassware and ceramicware, with high-glaze finishes or polyhalogenated hydrocarbon liners. These containers may be used to collect the organic solvent-polymer mixture. If normal density polyethylene or polypropylene have sufficient strength at the temperatures of use they may also be used as construction materials for the containers.

Because of the inability of exterior heaters, such as band heaters, to heat these type of containers uniformly or without damage to the containers themselves, and as indicated above because of the inability of the immersion heaters to satisfactorily work, conventional heating techniques cannot be utilized with the container contemplated in this method. In lieu of conventional heating techniques the method of this invention utilizes microwave radiation which is applied to the containers causing molecular excitation, thus heating the organic solvent-polymer mixture to the flash point and/or boiling point of the solution. This type of heat is extremely efficient due to all energy being utilized to heat the mixture. Vacuum may be utilized to speed evaporation. Microwave-radiation is maintained until the solvent has been completely driven off and collected through a condenser or vacuum condenser for re-use. The use of microwave radiation of the vessles described allows the use of ceramic and polymer containers for polymer-solvent collection. At the end of the evaporation cycle the non-metallic containers are removed from the radiation chamber and, due to the type of containers used, the polymer of pigment, etc., easily separates from the containers due to their smooth non-porous nature.

A schematic of the apparatus that utilizes this method is shown as FIG. 1. Item 1 is a non-metallic solution holding vessel; item 2 is a microwave-radiation shielded housing; item 3 is the microwave generating tube and housing; item 4 is the collecting tubing for carrying off the solvent; item 5 is the condenser for liquefying the evaporating solvent; item 6 is a thermocouple; item 7 is a vapor pressure gauge; item 8 is an electrical switch activated by either the thermocouple reaching a predetermined temperature or the vapor pressure gauge sensing no solvent vapor in the air contained in the vapor collecting tube. FIG. 1 shows items 1, 4 and 2 in partial section. This allows one to view the interior of the microwave radiation shielded housing, the collecting tube and non-metallic container. Item 9 is the lid.

As indicated, the collected saturated mixture or solution of the organic solvent and polymer, which in any case are liquid at this point, are placed in Item 1; they may be placed in Item 1 from drums utilized during collecting the mixture or solutions, or these containers may be utilized to collect the washing solvent mixture during use at the plant. The vessel containing the mixture is next placed in the microwave-radiation shielded housing and exposed to the magnetron radiation at levels sufficient to heat the solution and boil off all the solvent.

Item 3, the magnetron microwave generator and housing, can be any of those types of magnetron produced by the RCA Corporation such as the RCA-8684 large power magnetron and other similar magnetrons produced by other companies. The magnetron tubes may be air cooled, water cooled, or fluid cooled. The only requirement for the magnetron is that it develop a sufficient radiation density to heat the polymer solvent mixture.

The housing must be impervious to microwave radiation, and be properly reflective to microwave radiation to concentrate the radiation at the container and its contents. Shielding is usually metallic.

After being placed in the microwave-radiation shielded housing and being subjected to the microwave radiation, the solvent vaporizes and rises up the collecting tube, 4, to the condenser, 5, which may be air or water cooled and into a clean receptacle, 1, and is recycled into the system. After the solvent is driven off, the mgnetron tube is shut off by the thermocouple, 6, or vapor pressure gauge, 7, activating a remote electrical switch, 8. The vessel, 1, is left with a dried cake of polymer or pigment. Due to the smoothness of the containers, since they are a glazed ceramic glass, teflon or other smooth polymer, the condensed or precipitated residue left after the evaporation of the solvent can easily be freed from the container and discarded as a dry cake. If the polymer is not degraded, it may be reground and recycled in the manufacturing process of the user. Naturally, if a small amount of residue is left in the container it will not interfere with its reuse since the micro-wave radiation does not depend upon conductive walls for heating.

An example of utilization of this apparatus is as follows:

EXAMPLE I

A solution of urethane polymer in methylene chloride, collected from the washing of molds and mixing heads in a typical urethane foam processing plant, at a concentration of fifty weight percent polyurethane is collected from the washing of the mixing head and molds in a 100 Gallon container. The container is ceramic with a liner of a wholly fluorinated hydrocarbon of C-4 through C-6 chain length (such as the trademark material Teflon ® produced by the DuPont Company). This container is completely open on top and has a snap-on polyethylene lid for transportation from the area of collecting the polyurethane-methylene chloride solution to the apparatus. The container is rolled into a microwave radiation shielded housing. The housing is secured to the floor of the area where the apparatus is located and is constructed with microwave radiation shielding. A large swing door is fit into the housng to allow the rolling of the solvent-polyurethane solution container in the shielded location. Once the container is within the shielded housing the snap-on polyurethane lid is removed and the collecting tube, which has a flared nozzle, FIG. 1, is lowered over the housing until it is contacting the vessel and totally enclosing the top of the container. The chamber door is then closed and a magnetron tube is remotely activated, heating the vessel to the boiling point of the solution which is approximately 43 degrees centigrade. The magnetron tube maintains the microwave radiation and a thermocouple records the ascending temperature of the solution as it is concentrated. The solvent, which is evaporated, is carried via the overhead tube into a condensing vessel cooled by ordinary tap water. The solvent is recollected. The boiling point of the mixture approaches 60 degrees centigrade and the vapor pressure gauge located in the overhead housing denotes an absence of solvent content. The vapor pressure gauge activates a remote power switch automatically shutting off the magnetron tube. A warning light goes on indicating that the solution is now fully evaporated. The container is removed from the shielded housing and placed in a holding area for cooling. The container is air cooled to ambient temperature at which point the polymer, due to shrinkage, detaches from the fluora carbon liner and is removed from the container. The container is then recirculated in the plant for collecting additional materials.

EXAMPLE II

In a plant producing polyester reinforced fiberglass vessels, a wash solution is utilized to clean the molds and tools utilized in preparing the vessels. The solvent utilized is acetone. When the solvent becomes saturated with polyester resin, i.e. approximately a 50% by weight solution of solvent and polyester resin, it is flushed into a container which is constructed from heavy density polyethylene. The container is capped with a snap-on heavy density polyethylene lid and rolled to an area where the collecting device is maintained. The container is rolled into a micro-radiation shielded housing and the snap-on lid is removed. The flared tubing is placed over the vessel and the magnetron tube activated externally after closing the housing. The magnetron tube is preset to provide enough energy to bring the solution to boiling at the most concentrated level which is 90° centigrade. At the point when the vapor pressure guage indicates a zero outflow from the container the magnetron tube is turned off by an automatic switch tied into the vapor pressure gauge. The vapor pressure gauge is within the tubing in the housing. The evaporating acetone is collected through a condenser which is air cooled and collected in 55 gallon drums for reuse. When the magnetron tube is no longer operating the housing is opened and the container removed. The container is placed in a holding area and is allowed to air cool to ambient temperature. At that temperature the polyester resin has, by shrinkage, separated from the heavy duty polyethylene container and can be removed with minimal effort. The resin may be recycled or discarded.

EXAMPLE III

A dispersion of titanium dioxide, polypropylene chips and latex carrier in water at about 75 wt. percent solids is collected in a 500 gallon ceramic vessel with a polyfluorinated carbon liner. The dispersion-containing vessel is placed in a microwave radiation shielded housing and a flared flexible tube is placed over the entire top of the vessel in flush contact with the lip of the vessel. A vacuum pump connected to the vessel is activated drawing the pressure to 11 psia. After establishing the vacuum, a magnetron tube (the RCA-8684 magnetron tube or equivalent) is turned on and the dispersion heated to the boiling point. The evaporated water is vented or condensed and when a pressure guage indicates zero water vapor, the magnetron tube automatically shuts down. The vessel is removed from the housing after a few moments and allowed to cool. The solid residue is recirculated to the system for re-use.

EXAMPLE IV

A saturated solution of acrylate, photo curable polymer in methylene chloride, collected from selective washing of printed circuit boards, is placed in a one thousand gallon polyethylene container. The container has a snap on cover which is used to allow transfer of the full container to the recovery apparatus. The container is placed in a microwave radiation shielded housing through a swing-hinged portal and a flexible flared hose is placed over the container. The portal is closed and a 30 amp magnetron tube activated remotely. The solution is brought to a boil, about 50° C., and microradiation continued until a vapor pressure gauge in the hose indicates almost a zero level of escaping vapor. The methylene chloride vapor is condensed in a water cooled heat exchanger and recirculated into the system. The container is removed from the housing and allowed to cool to room temperature at which point the acrylate has shrunk and may be removed from the container's smooth sides by inverting the container.

Naturally variations in materials and size of containers as well as substitution of solvent-polymer mixtures not explicitly included herein are within the contemplation of this invention.

Having described my invention, I claim:

1. An apparatus for recapturing solvent from a liquid comprised of a solution of solvent and polymer or a mixture of solvent and pigment which comprises a nonmetallic holding vessel for retaining said liquid solvent-solid mixture or solution; a microwave radiation shielded housing sufficiently large to accomodate said nonmetallic holding vessel; a collecting tube of nonmetallic material passing through the top of the housing and connecting the holding vessel in sealed relationship to a condenser located outside of the housing and at substantially the same level as the vessel, said connecting tube receiving distilled solvent from the liquid solution or liquid solvent-solid mixture and allows transfer of the distilled solvent from the vessel to the condenser; a magnetron radiation power source contained within said microwave radiation shielded housing and activated exteriorly of the housing by a magnetron generator; a thermocouple and vapor gauge within the collecting tube controlling the operation of the magnetron generator through a switch; the said thermocouple responding to predetermined temperature of the distilled solvent and the gauge responding to an essentially zero solvent vapor pressure, respectively, in the generator control.

2. An apparatus in accordance with claim 1 wherein the system contains in addition a vacuum means whereby the pressure in the microwave shielded housing may be reduced, thus aiding in the distillation of the solvent.

* * * * *